(12) United States Patent
Reichard (10) Patent No.: US 6,366,064 B1
(45) Date of Patent: Apr. 2, 2002

(54) DUAL MODE CONTROLLER FOR SWITCHING CIRCUIRTY

(75) Inventor: Jeffrey A. Reichard, Oconomowoc, WI (US)

(73) Assignee: American Superconductor Corporation, Westborough, MA (US)

( * ) Notice: Subject to any disclaimer, the term of this patent is extended or adjusted under 35 U.S.C. 154(b) by 0 days.

(21) Appl. No.: 09/676,840

(22) Filed: Sep. 29, 2000

(51) Int. Cl.[7] ................................................. G05F 3/16
(52) U.S. Cl. ...................................... 323/224; 323/282
(58) Field of Search .............................. 323/222, 224, 323/282, 285, 288, 283

(56) References Cited

U.S. PATENT DOCUMENTS 5,612,580 A * 3/1997 Janonis et al. ................ 307/64
5,629,610 A * 5/1997 Pedrazzini et al. .......... 323/283
5,691,628 A * 11/1997 Martin ......................... 323/237
5,982,160 A * 11/1999 Walters et al. .............. 323/282

* cited by examiner

Primary Examiner—Adolf Deneke Berhane
(74) Attorney, Agent, or Firm—Fish & Richardson P.C.

(57) ABSTRACT

A dual mode controller is used to control switching circuitry by operating in either a voltage mode or a current mode on the basis of an output signal of the switching circuitry. The dual mode controller includes a voltage mode controller, a current mode controller, and a control circuit to control one of the voltage mode controller or current mode controller in response to the output signal of the switching circuit. The voltage mode controller and current mode controller can generate first and second pulse width modulated signals. The control circuit, in response to the output signal from the switching circuitry, operates the voltage mode controller and current mode controllers to provide one of the first pulse width modulated signal and the second pulse width modulated signal to an input of the switching circuitry.

41 Claims, 8 Drawing Sheets

DUAL MODE CONTROLLER FOR SWITCHING CIRCUIRTY

TECHNICAL FIELD

This invention relates to switch-mode circuitry and more particularly to controlling such switch-mode circuitry.

BACKGROUND

Semiconductor-based power electronic converters are often used to conform electrical power generated from various power sources to a fixed frequency (e.g., 60 Hz) phase-synchronized alternating current. Such power converters include inverters which convert (invert) DC to AC. These inverter circuits can be used in utility electrical power applications, as well as for adjustable speed drives (ASDs) for electric motors. A number of different design topologies are in use for the converters, which generally require an energy storage element to link the converters to the load. Unfortunately, in any inversion process, a portion of the generated power is wasted due primarily to the dissipation occurring within the large energy storage devices (e.g., inductors, capacitors) and within the semiconductor devices themselves. It is desired that any losses associated with the conversion and regulation of generated power be minimized.

SUMMARY

The invention features a dual mode controller for controlling switching circuitry used for example in an inverter.

In a general aspect of the invention, the dual mode controller includes a voltage mode controller, a current mode controller, and a control circuit for operating the dual mode controller in a voltage mode or a current mode in response to an output signal of the switching circuitry.

A number of advantages are provided with a dual mode controller having both voltage mode and current mode controllers for operating in voltage and current modes, respectively. Operating in the voltage mode and current modes both have their attributes, each making them desirable for use in different circumstances. For example, during periods of operation in which the load is relatively "well-behaved" (i.e., no large changes in load), voltage mode operation is preferable because the switching circuitry has less low frequency harmonics and generates lower system losses. However, the voltage mode of operation does not generally react well to large and fast changes in load, for example, due to transients at the load. In such circumstances, the dual mode controller uses its current mode controller. Although the current mode controller operates with less efficiency and generates more harmonics, its ability to provide a pulse width modulated waveform that can rapidly respond to transients while maintaining its frequency and phase characteristics is attractive. Furthermore, it is anticipated that for many applications the switching circuitry will be predominantly controlled by the relatively efficient voltage mode controller, and the current mode controller will be used only during those limited times that it is needed. Thus, smaller and less expensive components used for the switching circuitry can be used.

Embodiments of this aspect of the invention may include one or more of the following features.

The voltage mode controller and the current mode controller generate a first pulse width modulated (PWM) signal and a second pulse width modulated signal, respectively. The dual mode controller further includes a selector for receiving the first pulse width modulated signal and the second pulse width modulated signal and an output connected to the switching circuitry. The dual mode controller also includes sensing circuitry which generates an output signal from the switching circuitry and a control circuit. In response to the output signal from the sensing circuitry, the control circuit controls the selector to provide one of the first pulse width modulated signal and the second pulse width modulated signal to an input of the switching circuitry.

The voltage mode controller includes a processor including an input for receiving a DC voltage from a DC source and an output for providing a center-aligned first pulse width modulated signal. Among other advantages, operating the voltage mode controller using center-aligned pulse width modulation advantageously reduces the level of harmonics, thereby reducing noise and filter component dissipation.

The current mode controller includes a first comparator circuit having first and second inputs for receiving first and second reference signals, respectively, and a third input for receiving an output signal of the switching circuitry. The current mode controller also includes a logic circuit connected to the comparator circuit for providing the second pulse width generated waveform on the basis of the amplitude of the output signal of the switching circuitry relative to the amplitude of the first reference signal and second reference signal.

In operation, the control circuit of the dual mode controller is configured to control the selector to provide the second pulse width modulated signal to the input of the switching circuitry when the amplitude of the output signal of the switching circuitry is greater than the amplitude of the first reference signal or less than the amplitude of the second reference signal.

The control circuit also includes edge detection circuitry for examining edge transitions of the first pulse width modulated output signal and the second pulse width modulated output signal. In operation, the edge detection circuitry and processor of the voltage mode controller are configured to allow alignment of the edge transitions of pulses from the first pulse width modulated output signal with edge transitions of pulses from the second pulse width modulated output signal. Specifically, the edge detection circuitry calculates the time difference between edge transitions of pulses from the first pulse width modulated output signal with corresponding edge transitions of pulse from the second pulse width modulated output signal allowing the edge detection circuitry to adjust the hysteresis band (defined by the values of the first reference signal and the second reference signal), which can then be used to synchronize the pulses.

By ensuring that the edge transitions between the pulses of the first PWM output signal (from the voltage mode controller) align with corresponding edge transitions of pulse from the second PWM output signal (from the current mode controller), an effectively seamless transition between switching from current mode control to voltage mode control is provided. After transitioning back to the voltage mode, the control circuit resets the value of the first reference signal and the second reference signal to predetermined values for use by the voltage mode controller.

In another aspect of the invention, a dual mode controller is provided for controlling polyphase circuitry having a number of circuits operating with predetermined differential phase shifts relative to each other. In the polyphase arrangement, the dual mode controller includes a voltage mode controller, a current mode controller, and a control circuit that operates one of the voltage mode controller and current mode controller on the basis of at least one of a plurality of output signals from the switching circuits.

In embodiments of this aspect of the invention, the voltage mode controller and the current mode controller generate a first and a second plurality of pulse width modulated signals, respectively, for each of the circuits of the polyphase switching circuitry. A selector receives the first and second plurality of pulse width modulated signals and the second plurality of pulse width modulated signals. Sensing circuitry detects output signals from each of the circuits of the polyphase switching circuitry and generates a corresponding plurality of output signals. A control circuit, in response to the output signals from the sensing circuitry, controls the selector to provide one of the first plurality of pulse width modulated signals and the second plurality of pulse width modulated signals to an input of the switching circuitry. The multi-fold increase in efficiency offers a tremendous decrease in size of the components and cost of the overall system.

In still another aspect of the invention, a method for controlling switching circuitry includes operating in either a voltage mode or a current mode on the basis of an output signal of the switching circuitry.

In a related aspect of the invention, a method for controlling polyphase switching circuitry having switching circuits operating with predetermined differential phase shifts relative to each other. In this aspect, the method includes operating in the voltage mode or the current mode on the basis of an output signal from at least one of the switching circuits of the polyphase switching circuitry.

Embodiments of these aspects of the invention may include one or more of the following features. The voltage mode controller and current mode controller are used generate first and second pulse width modulated signals, respectively.

The output signal of the switching circuitry is sensed and a determination is made as to whether an amplitude level of the output signal is between a first amplitude level and a second amplitude level, which define a predetermined range. The switching circuitry is operated with the voltage mode controller when the amplitude level of the output signal is within the range. On the other hand the switching circuitry is operated with the current mode controller when the amplitude level of the output signal is outside the range. The determining step includes comparing the amplitude level of the output signal with the first amplitude level and the second amplitude level.

Operating in a voltage mode includes providing a first pulse width modulated waveform, preferably center-aligned, to the switching circuitry and operating in the current mode includes providing a second pulse width modulated waveform to the switching circuitry.

When operating in the current mode, the relative alignment of edge transitions of pulses from the first pulse width modulated waveform and the second pulse width modulated waveform is determined. Switching to the voltage mode occurs when the edge transitions of pulses from the first pulse width modulated waveform align with the second pulse width modulated waveform. In one embodiment, aligning the edge transitions of pulses from the first pulse width modulated waveform with edge transitions of pulses from the second pulse width modulated waveform includes adjusting the first amplitude level and the second amplitude level, which define the predetermined range.

After switching to the voltage mode from the current mode, resetting the first amplitude level and the second amplitude level to predetermined values. Resetting the first amplitude level and second amplitude level includes using a comparator circuit having inputs for receiving the predetermined values.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
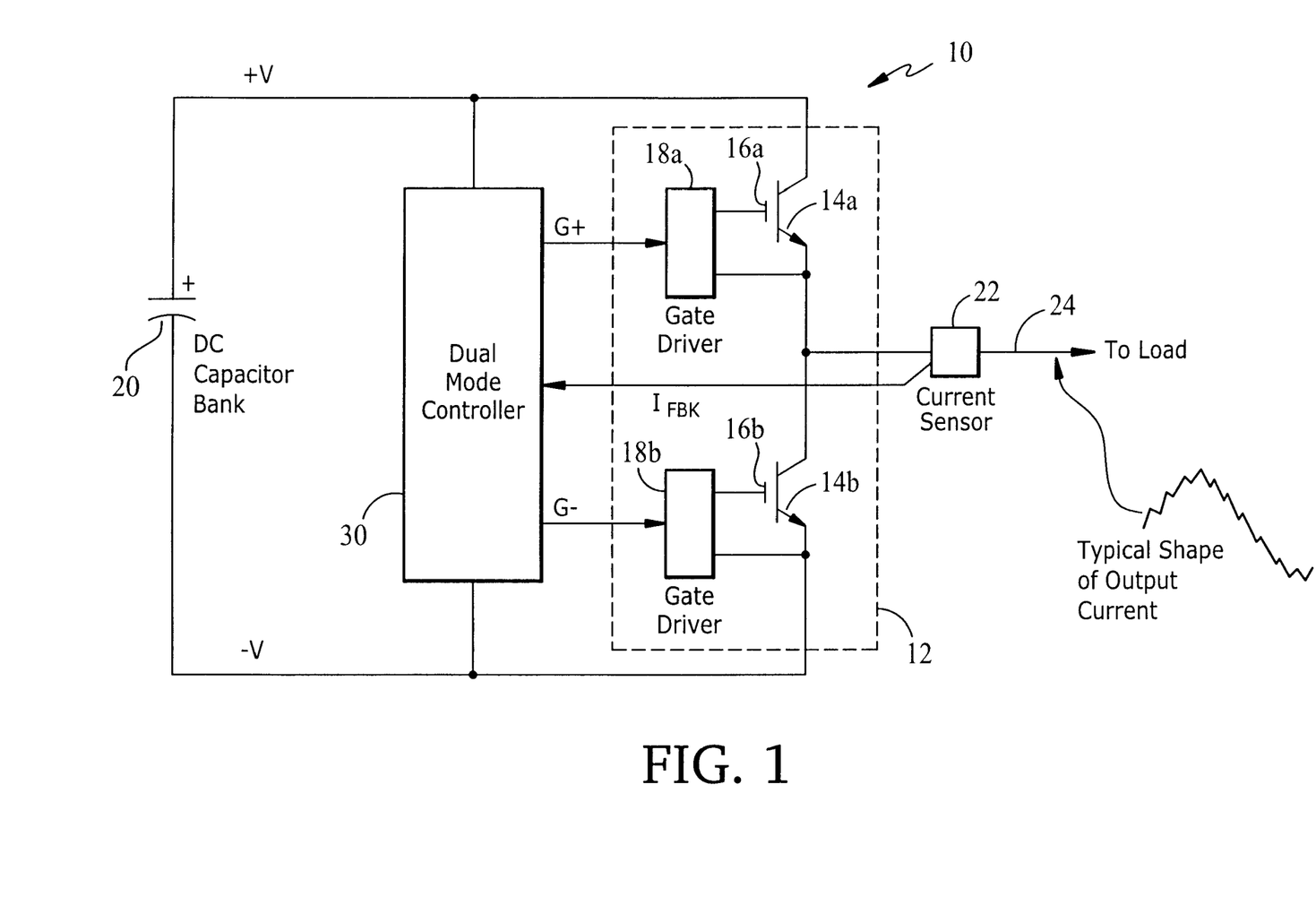
FIG. 1 is a block diagram representation of a single-phase inverter circuit including a dual mode controller.

Referring to FIG. 1, a power conversion system 10 includes a switch-mode circuit 12 having a pair of switching transistors 14a, 14b with gate electrodes 16a, 16b driven by a pair of gate drivers 18a, 18b, respectively. In the configuration shown in FIG. 1, the switching transistors are operated as a single-phase DC to AC inverter connected to an external load. In response to control signals applied to the gate electrodes of the switching transistors, switch-mode circuit 12 provides a pulse-width modulated waveform at the output of the inverter. For reasons discussed in greater detail below, additional pairs of switching transistors can be used advantageously in polyphase arrangements (e.g., three-phase).

Conversion system 10 also includes a dual mode controller 30 which receives a DC signal from a DC power source 20 and generates drive signals (G+, G−) for gate drivers 18a, 18b. DC power source 20 can be any of a wide variety of DC power sources including a flywheel, capacitive bank, or fuel cell battery. In certain embodiments, DC source 20 can be a D-SMES device, such as those described in Application Ser. No. 09/449,435, entitled "Electric Utility System with Superconducting Magnetic Storage" filed Nov. 24, 1999, assigned to the assignee of this application, and incorporated herein by reference. A current sensor 22 is connected to an output line 24 to provide an output signal ($I_{fbk}$) to dual mode controller 30. As will be described in greater detail below, dual mode controller 30 is switched between operation in a "voltage mode" and a "current mode" on the basis of the ($I_{fbk}$) signal. Operation in a "voltage mode" and "current mode" refers to power sources that are operated to deliver essentially constant voltage and constant current, respectively.

Figure 2:
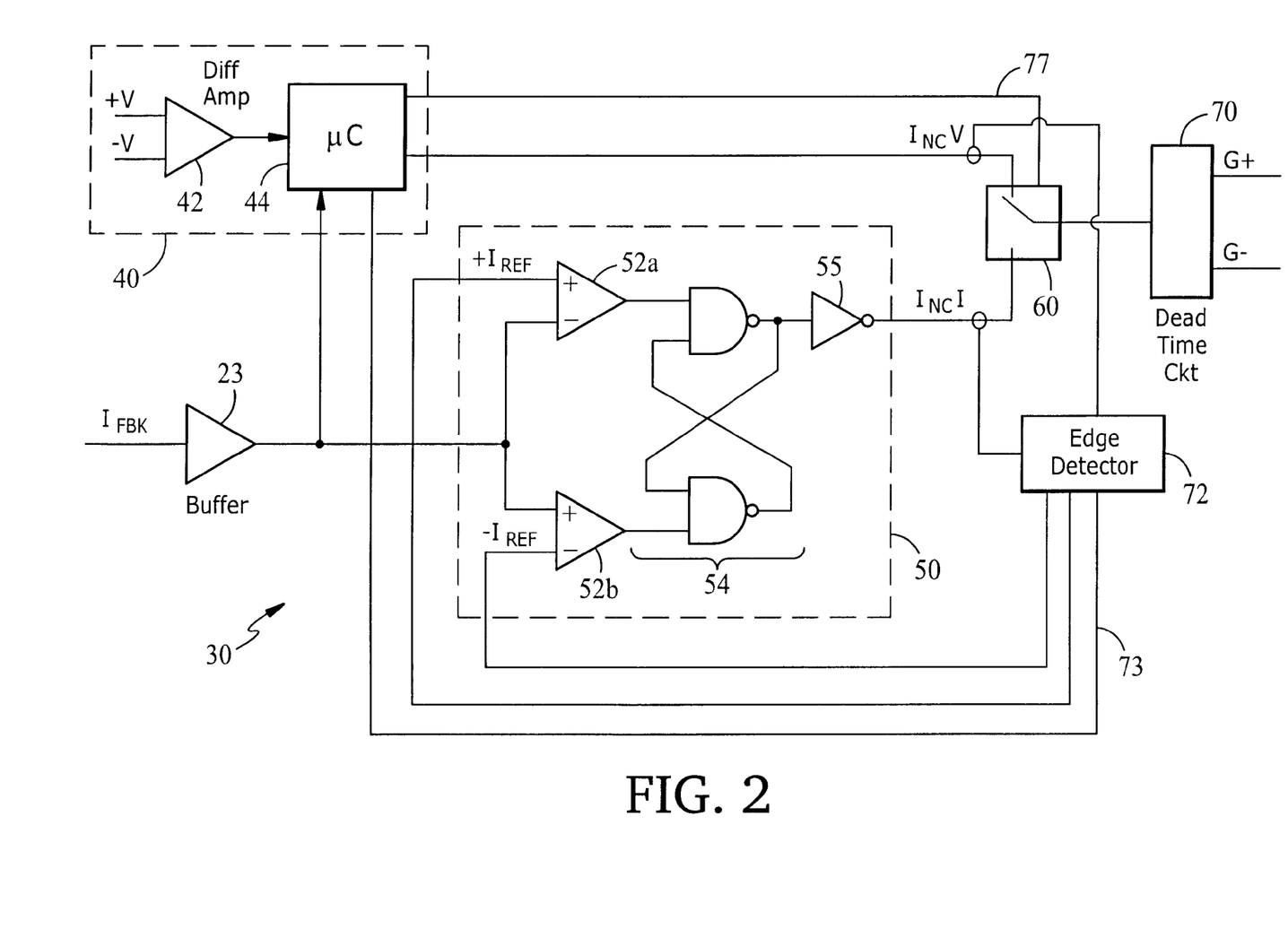
FIG. 2 is a block diagram representation of the dual mode controller of FIG. 1 including a voltage mode controller and a current mode controller.

Referring to FIG. 2, dual mode controller 30 includes a voltage mode controller 40 and a current mode controller 50, each having an output connected, through a selector 60, to switch-mode circuit 12 (through a deadtime circuit 70). In this embodiment, dual mode controller 30 includes a deadtime circuit 70 connected to selector 60 to ensure that switching transistors 14a, 14b operate during different portions of a switching cycle. This period between switching one device off and switching the other on, often referred to as "deadtime," is generally required to prevent the possibility of opposing switching devices of the switch-mode circuit 12 closing simultaneously. This condition, known as "shoot through," can be fatal to the switching devices, and even if not fatal constitutes an unacceptably large increase in power dissipation in high efficiency conversion circuitry.

Voltage mode controller 40 includes a differential amplifier 42 for receiving the DC voltage from source 20 and a microcontroller 44 which, in operation, generates a pulse-width modulated waveform (IncV) to selector 60. Although there are a number of suitable microcontrollers available for use in generating PWM waveforms, one example of a microcontroller for use with voltage mode controller 40 is available from Motorola, Inc. (Product No. MC68376). The MC68376 microcontroller is a highly integrated 32 bit microcontroller which incorporates, among other functionality, a System Integration Module, a Queued A/D converter, a 4 KB static RAM, and an 8 KB masked ROM. The MC68376 microcontroller also includes four dedicated pulse width modulated (PWM) channels. One approach for operating the MC68376 microcontroller as a PWM generator is described in Motorola Application Note TPU PN05/D, entitled "MultiChannel PWM TPU Function (MCPWM)", which is incorporated herein by reference. As is shown in FIG. 2, the $I_{fbk}$ signal is provided to microcontroller 44 via buffer amplifier 23 for status information.

Current mode controller 50 also generates a pulse-width modulated waveform (IncI) using a logic circuit having a pair of comparators 52a, 52b, an RS flip-flop 54, and an inverter 55. In response to the level of the $I_{fbk}$ signal provided to inputs of comparators 52a, 52b, current mode controller 50 generates waveform (IncI) and provides it to selector 60. For reasons discussed below, dual mode controller 30 also includes edge detection circuitry 72, which monitors edge transitions for the PWM waveforms (IncV and IncI) from voltage mode controller 40 and current mode controller 50. Edge detection circuitry 72 is in the form of a Complex Programmable Logic Device (CPLD), for example, Product No. XC95216, manufactured by Xilinx, Inc., San Jose, Calif.

In a normal mode of operation, dual mode controller 30 is used to provide the pulse width modulated waveform (IncV) from voltage mode controller 40. A "normal" mode of operation means that transients present an output signal ($I_{fbk}$) are within a preselected acceptable range defined by an upper amplitude level (+$I_{ref}$) and a lower amplitude level (−$I_{ref}$). As will be discussed below, the amplitude of the output level ($I_{fbk}$) is constantly monitored to determine whether it is between +$I_{ref}$ and −$I_{ref}$.

Using the PWM waveform (IncV) to drive switch-mode circuit 12 is preferable (particularly in polyphase systems) because center-aligned PWM operation can be used. As is known in the art, the level of harmonics and associated noise is significantly reduced when center-aligned PWM is used rather than edge-aligned PWM. Thus, when operating in voltage mode, the PWM waveform has less noise and consumes less power. Thus, smaller and less expensive magnetic components (e.g., inductors) can be used. Furthermore, in this application, the switch-mode inverter runs cooler and generates a cleaner, more easily regulated waveform. Operating in the current mode, however, provides advantages not realized when operating in voltage mode. In particular, although current mode is noisier and less efficient, it is much more responsive (virtually instantaneous from pulse-to-pulse) to large and rapid changes at the load. Even under such conditions, the frequency, phase, and general shape of the waveform is substantially maintained. That is, the integrity of the frequency and phase characteristics of the waveform is not sacrificed. Thus, during normal operation, power conversion system 10 is operated in the more efficient voltage mode of operation. However, in the event of a large transient (e.g., fault condition) at the load, the power conversion system is switched into the albeit, less efficient, but more stable current mode of operation. Because in most applications, large transients occur relatively infrequently, power conversion system 10 will operate in the voltage mode a substantial amount of time (e.g., >95%).

Figure 3:
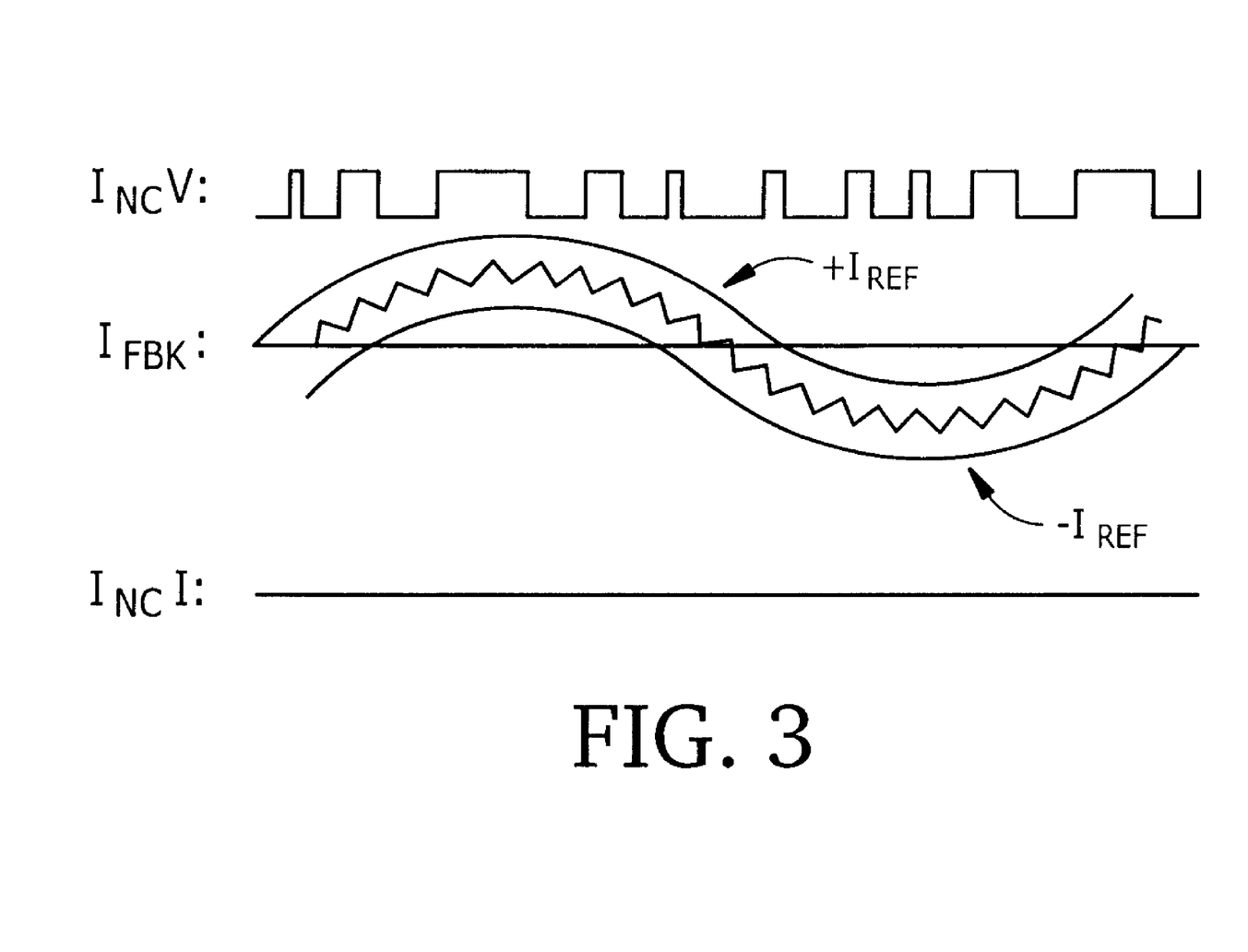
FIG. 3 illustrates a typical waveform for the output of the inverter circuit operating in voltage mode, as well as corresponding typical waveforms from the voltage mode and current mode controllers of FIG. 2.
Figure 4:
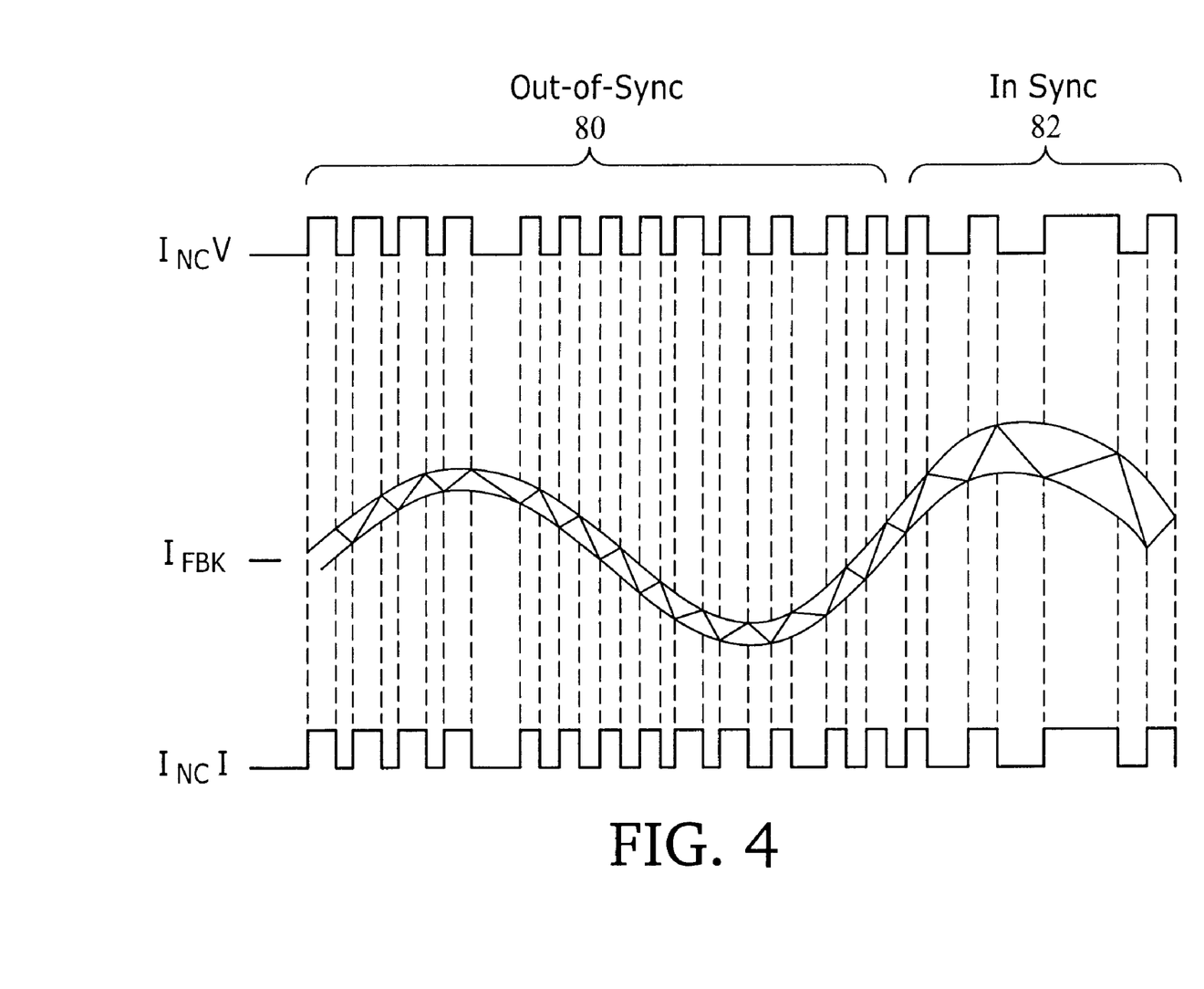
FIG. 4 illustrates a typical waveform for the output of the inverter circuit operating in current mode, as well as corresponding typical waveforms from the voltage mode and current mode controllers of FIG. 2.
Figure 5:
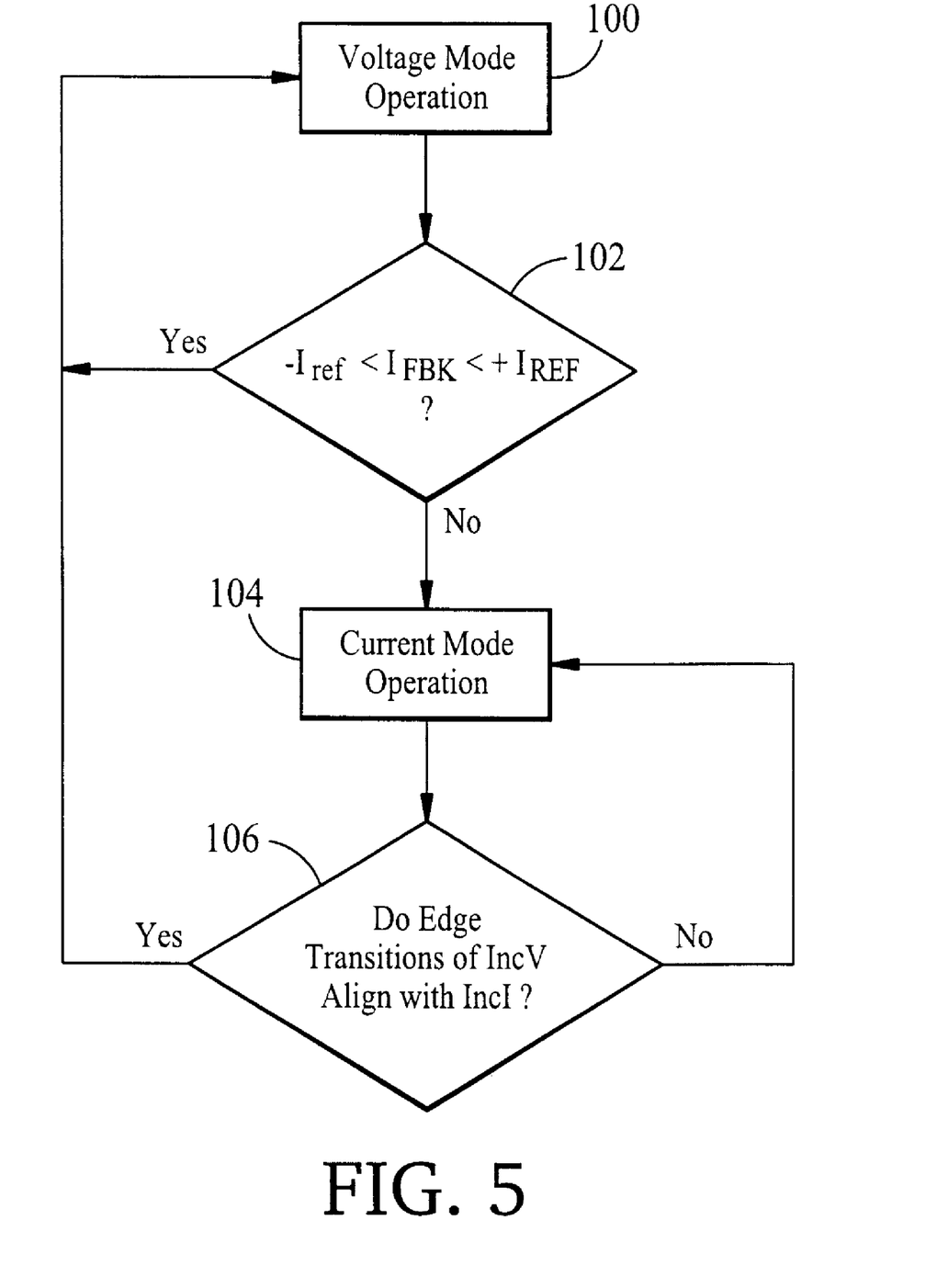
FIG. 5 is a flow diagram illustrating the basic operation of the dual mode controller of FIG. 2.

With reference to FIGS. 3–5, the operation of dual mode controller 30 will now be described. During normal operation of power conversion system 10, selector 60 is in position for voltage mode operation (step 100). That is, the PWM waveform IncV generated by voltage mode controller 40 is provided to gate drivers 18a, 18b of switch-mode circuit 12. In this voltage mode, amplitude levels (+$I_{ref}$, −$I_{ref}$) define a window within which voltage mode controller 40 can comfortably and reliably provide a PWM waveform. It is important to note that during the voltage mode operation, current mode controller 50 continuously monitors output signal ($I_{fbk}$) to determine whether operation in the voltage mode should continue. In particular, comparators 52a, 52b receive the output signal from current sensor 22 (FIG. 1), via buffer amplifier 23. If the output signal ($I_{fbk}$) is within the range defined, by +$I_{ref}$ and −$I_{ref}$, the output from RS flip-flop 54 (represented by IncI) remains in its previous state (either "high" from comparator 52a or "low" from comparator 52b) and PWM waveform IncV is provided from microcontroller 44 to selector 60.

However, sharp changes in the impedance of the load or transients (e.g., caused by a lightning strike) may cause the amplitude of output signal ($I_{fbk}$) to extend either above upper amplitude level (+$I_{ref}$) or below lower amplitude level (−$I_{ref}$). The increase in amplitude is detected by one of comparators 52a, 52b of current mode controller 50 (step 102) and selector 60 is switched into the current mode of operation by the combination of edge detection circuitry 72 and microcontroller 44. Specifically, edge detection circuitry 72 senses a change in state of the IncI waveform along line 79 and informs microcontroller 44 of the change in status along line 73. Microcontroller 44 in turn transmits a signal along line 77 to switch selector 60. In the current mode of operation, PWM waveform IncI generated by comparators 52a, 52b and R/S flip-flop 54 is used to control switch-mode circuit 12.

As discussed above, in the voltage mode, (+$I_{ref}$, −$I_{ref}$) represent preset upper and lower values defining an amplitude range or window within which PWM waveform IncV is used to control switch-mode circuit 12. In the voltage mode, the values of (+$I_{ref}$, −$I_{ref}$) are set at levels which should not be exceeded. However, for reasons discussed below, in the current mode, the values of (+$I_{ref}$, –$I_{ref}$) are adjusted to control the output frequency and waveshape.

Referring to FIGS. 2 and 4, assume that the amplitude level of output signal ($I_{fbk}$) is decreasing. When the amplitude level decreases below –$I_{ref}$, comparator 52b changes state causing IncI to start to increase. Eventually $I_{fbk}$ will become greater than –$I_{ref}$ and comparator 52b changes state once again. The $I_{fbk}$ signal continues to increase until the amplitude level exceeds +$I_{ref}$ at which point comparator 52a changes state and $I_{fbk}$ starts to decrease. Thus, the constant monitoring of the amplitude level of the $I_{fbk}$ signal relative to the values of +$I_{ref}$ and –$I_{ref}$ are used to generate PWM waveform IncI. The resulting PWM waveform IncI (see FIG. 4) is provided to gate drivers 18a, 18b of switch-mode circuit 12.

Because the current mode of operation is less efficient and noisier than the voltage mode of operation, it is generally desirable to switch back to the voltage mode of operation as soon as possible. Thus, even after switching into the current mode, voltage mode controller 40 continues to generate PWM waveform IncV.

Although switching from voltage mode to current mode occurs simply on the basis of whether the output signal ($I_{fbk}$) is maintained within a preselected range, switching from current mode to voltage mode requires other considerations. In particular, in order to ensure a relatively uninterrupted transition from the current mode to the voltage mode, edge detection circuitry 72 does not switch selector 60 back to the voltage mode until the pulse width and duty cycle of the PWM waveform IncI and PWM waveform IncV are synchronized. Specifically, edge detection circuitry 72 adjusts the values of +$I_{ref}$ and –$I_{ref}$, which, in turn controls the pulse width and duty cycle of the PWM waveform IncI. The values of +$I_{ref}$ and –$I_{ref}$ are provided along lines 76, 78 to comparators 52a, 52b. Arriving at the appropriate values of +$I_{ref}$ and –$I_{ref}$ occurs in a manner similar to that of a phase-locked-loop until the waveforms from voltage mode controller 40 and current mode controller are synchronized. For example, referring again to FIG. 4, during a first period (labeled 80) the edge transitions between corresponding pulses of PWM waveform IncV and PWM waveform IncI are misaligned. However, during a second period (labeled 82), edge detection circuitry adjusts the values of +$I_{ref}$ and –$I_{ref}$ (in this case, widens the window), thereby adjusting the time at which dual mode controller 50 change states. In this manner, the pulse width and duty cycle of the PWM waveform IncI are adjusted until corresponding edges of the pulses of PWM waveform IncV and PWM waveform IncI are aligned. When the PWM waveforms are aligned, edge detection circuitry 72 provides a signal along line 73 to microcontroller 44 which, in turn, provides a signal along line 77 to change the position of selector 60 so that dual mode controller 30 is now operated in voltage mode and resets the values of +$I_{ref}$ and –$I_{ref}$ to the preselected voltage mode values used by voltage mode controller 40 (step 104). Although switching back to the voltage mode may occur relatively quickly (e.g., almost immediately after the transient has passed) in many applications it may be desirable to allow a minimum number of cycles to pass before allowing switching back to the voltage mode of operation.

Figure 6A:
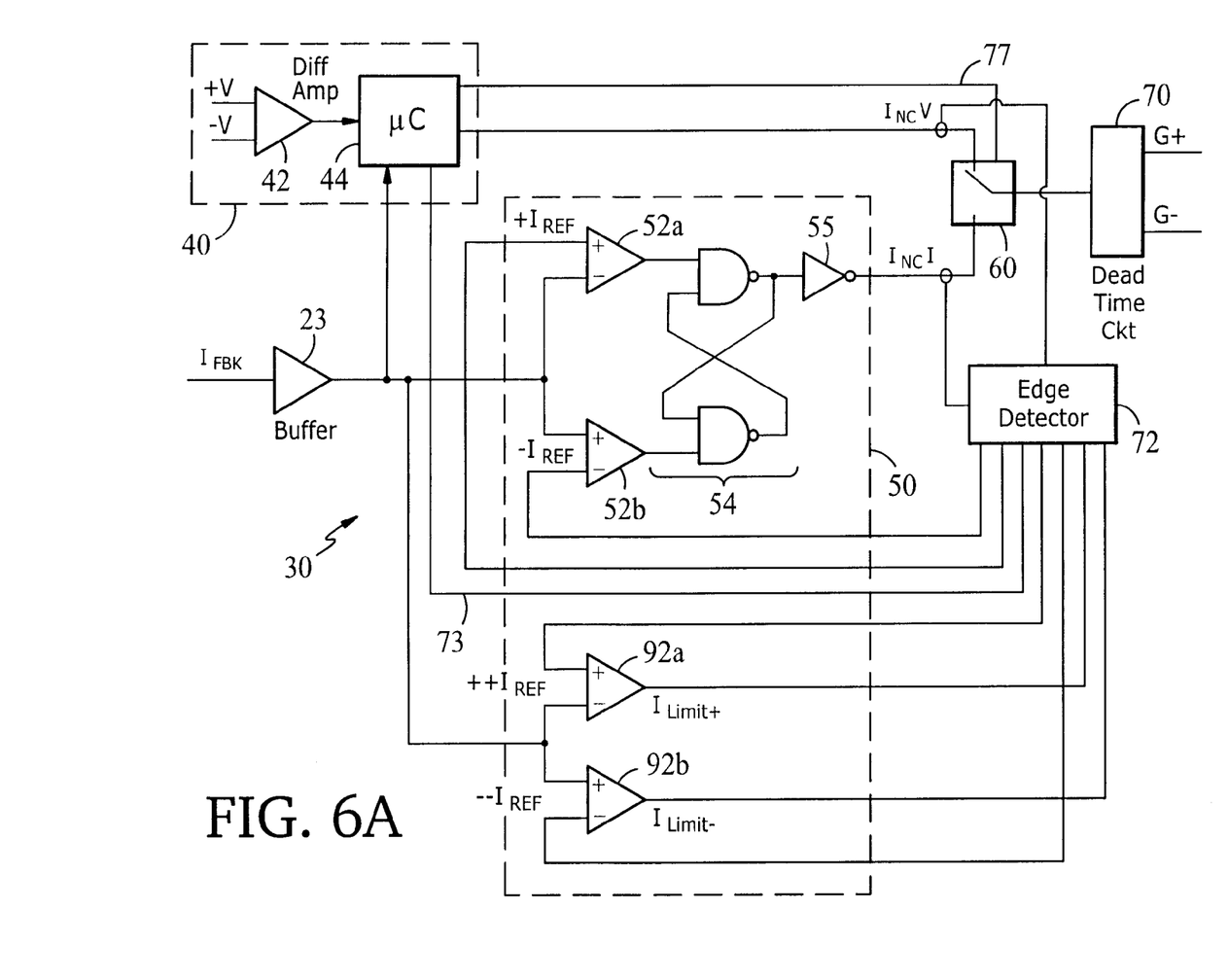
FIG. 6A is a block diagram representation of an alternate embodiment of a dual mode controller.
Figure 6B:
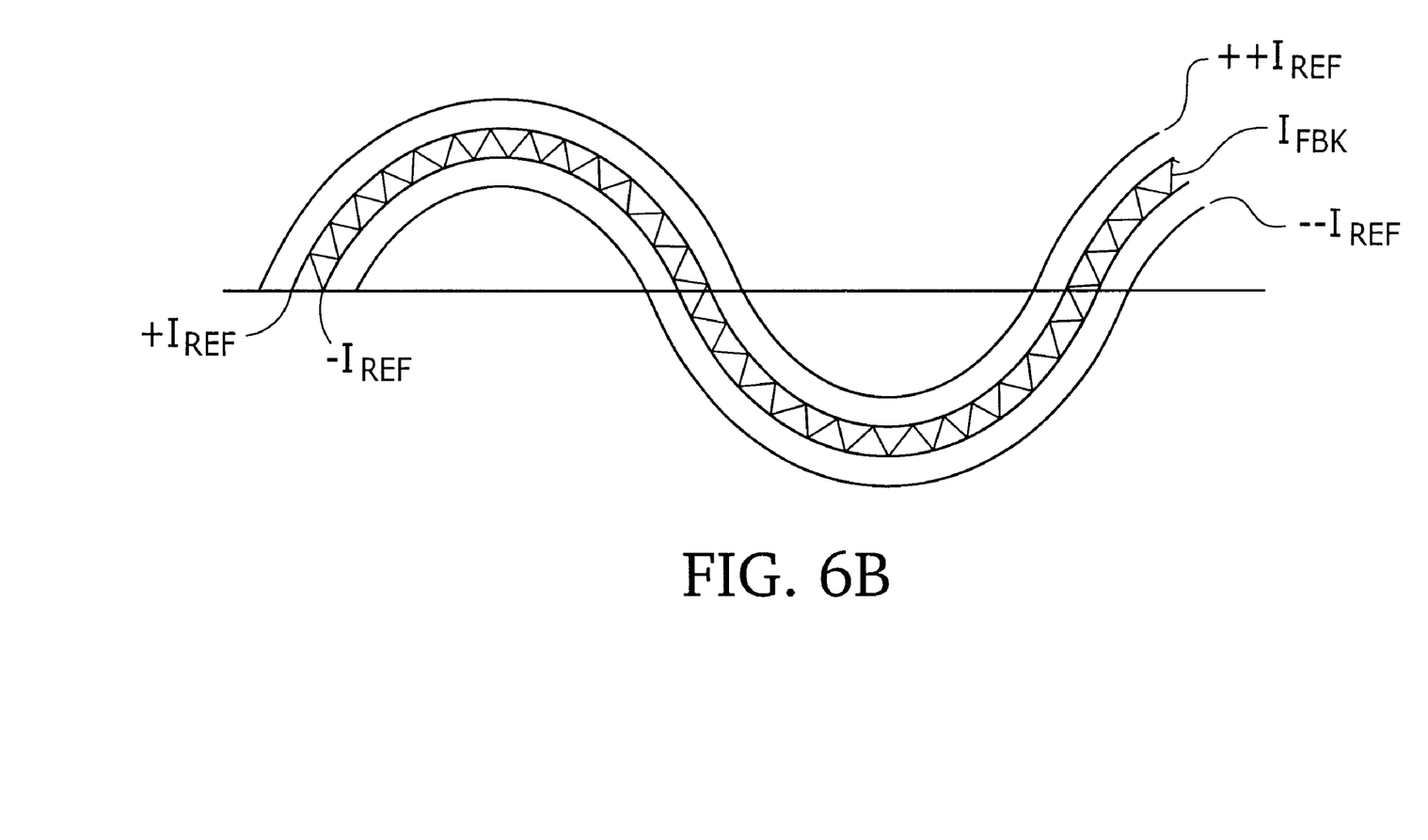
FIG. 6B illustrates a typical waveform for the output of the inverter circuit and the voltage ranges for use with the embodiment of FIG. 5A.

Referring to FIGS. 6A and 6B, in another embodiment, a current mode controller can have an arrangement which provides faster resetting to the preselected voltage mode values used by voltage mode controller 40. In this embodiment, a second pair of comparators 92a, 92b is used to establish the upper and lower values used by voltage mode controller 40. With this approach, the programmed values of +$I_{ref}$ and –$I_{ref}$ do not need to be reset when switching modes. In essence, the second pair of comparators 92a, 92b acts similarly to a digital switch for switching rapidly to the preselected voltage mode values used by voltage mode controller 40. In this embodiment, the ++$I_{ref}$ and ––$I_{ref}$ represent the preselected values for establishing the window for operation in the voltage mode. Thus, so long as the amplitude level of the $I_{fbk}$ signal lies between ++$I_{ref}$ and ––$I_{ref}$, the dual mode controller operates in voltage mode. When the amplitude level of the $I_{fbk}$ signal is either greater than ++$I_{ref}$ or less than ––$I_{ref}$, edge detection circuitry 72 switches to current mode. Once in the current mode, edge detection circuitry immediately uses the reference values of +$I_{ref}$ and –$I_{ref}$, in the same manner described above in conjunction with Fig. Including aligning edge transistions before switching back to voltage mode. Once back in voltage mode, edge detection circuitry immediately uses comparators 92a, 92b and the between ++$I_{ref}$ and ––$I_{ref}$ values to determine whether switching back to current mode is required.

It is important to appreciate that the concept described above in conjunction with FIGS. 1–4 is equally applicable for polyphase arrangements. Indeed, the multi-fold increase in efficiency offers a tremendous decrease in size of the components and cost of the overall system.

Figure 7:
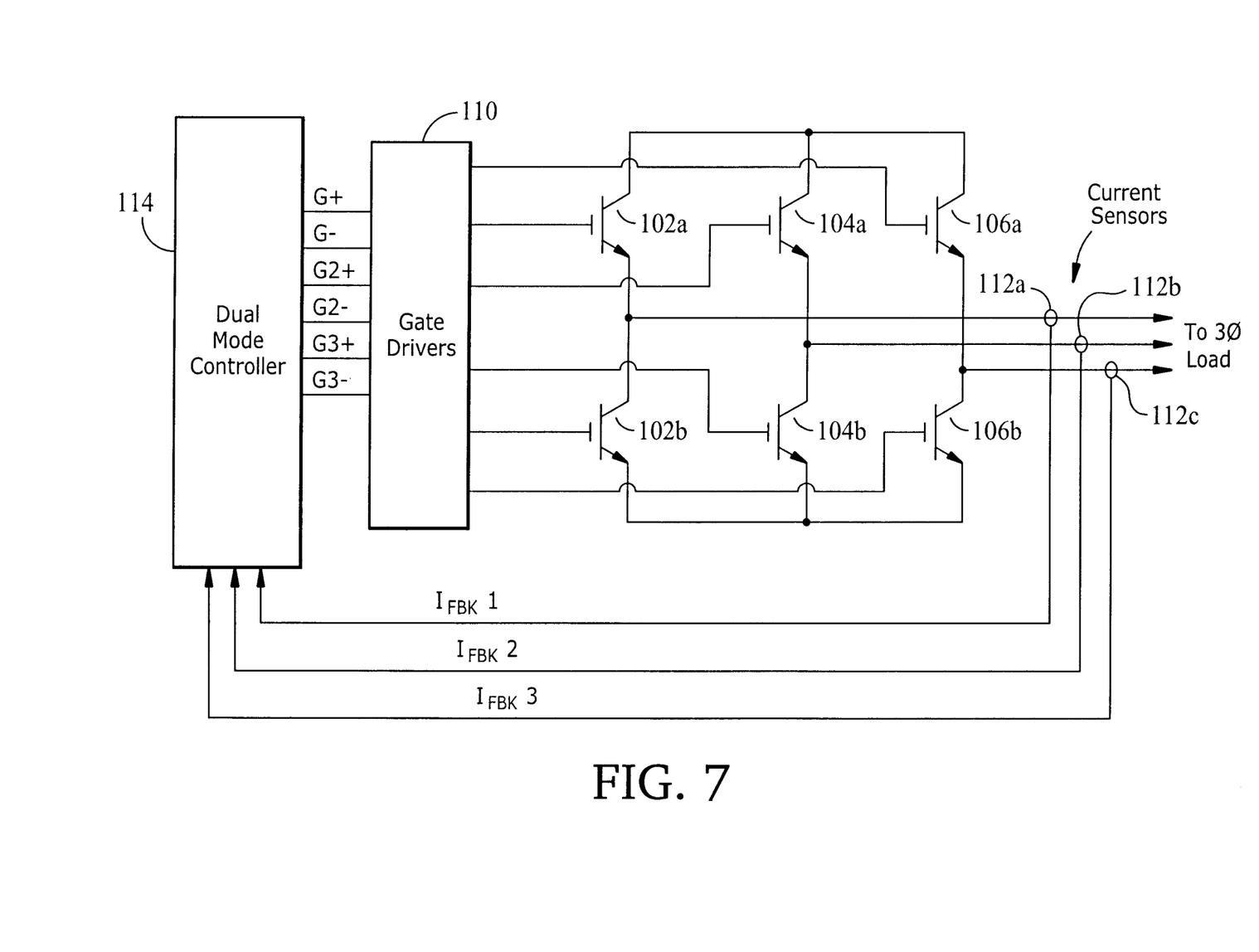
FIG. 7 is a block diagram representation of a polyphase inverter including a dual mode controller.

Referring to FIG. 7, for example, a three-phase switch-mode circuit 100 includes three pairs of switching transistors 102a, 102b, 104a, 104b, 106a, 106c, each pair associated with one of the three phases of the system. The switching transistors conduct in pairs for six distinct time intervals of commutation. In particular, each transistor pair conducts for 120°. Gate drivers (shown collectively as box 110) are provided for each switching transistor to generate gate control signals for each transistor. Each phase is monitored independently with current sensors 112a, 112b, 112c, which provide feedback signals ($I_{fbk1}$, $I_{fbk2}$, $I_{fbk3}$) to a dual mode controller 114. In operation, if a transient occurs on any of the three phases, such that the voltage exceeds the upper and lower amplitude levels (+$I_{ref}$, –$I_{ref}$), dual mode controller 114 will act to switch from voltage mode control to current mode control. Furthermore, it is important to appreciate that when switching from the current mode to the voltage mode will only occur when edges of the pulse waveforms for all three phases are aligned.

A number of embodiments of the invention have been described. Nevertheless, it will be understood that various modifications may be made without departing from the spirit and scope of the invention. Accordingly, other embodiments are within the scope of the following claims.

What is claimed is:

1. A dual mode controller for controlling switching circuitry, the dual mode controller comprising:
   a voltage mode controller;
   a current mode controller;
   a control circuit, connected to the voltage mode controller and current mode controller, the control circuit operating one of the voltage mode controller or current mode controller in response to an output signal of the switching circuitry.

2. The dual mode controller of claim 1 wherein the voltage mode controller generates a first pulse width modulated signal, the current mode controller generates a second pulse width modulated signal.

3. The dual mode controller of claim 2 further comprising a selector for receiving the first pulse width modulated signal and the second pulse width modulated signal and an output connected to the switching circuitry.

4. The dual mode controller of claim 3 further comprising sensing circuitry which detects the output signal from the switching circuitry and generates an output signal, the control circuit controlling the selector to provide one of the first pulse width modulated signal and the second pulse width modulated signal to an input of the switching circuitry.

5. The dual mode controller of claim 4 wherein the voltage mode controller includes a processor including an input for receiving a DC voltage from a DC source and an output for providing the first pulse width modulated signal, the first pulse width modulated signal being center-aligned.

6. The dual mode controller of claim 5 wherein the current mode controller includes:
   a first comparator circuit having a first input and a second input for receiving a first reference signal and second reference signal, respectively, and a third input signal for receiving the output signal of the switching circuitry; and
   a logic circuit connected to the comparator circuit for providing the second pulse width generated waveform on the basis of the amplitude of the output signal of the switching circuitry relative to the amplitude of the first reference signal and second reference signal.

7. The dual mode controller of claim 6 wherein the control circuit is configured to control the selector to provide the second pulse width modulated signal to the input of the switching circuitry when the amplitude of the output signal of the switching circuitry is greater than the amplitude of the first reference signal or less than the amplitude of the second reference signal.

8. The dual mode controller of claim 7 wherein the control circuit includes edge detection circuitry for examining edge transitions of the first pulse width modulated output signal and the second pulse width modulated output signal.

9. The dual mode controller of claim 8 wherein the edge detection circuitry and processor are configured to allow alignment of the edge transitions of pulses from the first pulse width modulated output signal with edge transitions of pulse from the second pulse width modulated output signal.

10. The dual mode controller of claim 9 wherein the edge detection circuitry is configured to align the edge transitions of pulses from the first pulse width modulated output signal with edge transitions of pulses from the second pulse width modulated output signal by adjusting a value of the first reference signal and the second reference signal.

11. The dual mode controller of claim 10 wherein the control circuit is configured to reset the value of the first reference signal and the second reference signal to predetermined values.

12. A dual mode controller for controlling polyphase switching circuitry having a plurality of switching circuits operating with predetermined differential phase shifts relative to each other, the dual mode controller comprising:
   a voltage mode controller;
   a current mode controller; and
   a control circuit connected to the voltage mode controller and the current mode controller, the control circuit operating one of the voltage mode controller and current mode controller on the basis of at least one of a plurality of output signals from the switching circuits.

13. The dual mode controller of claim 12 wherein the voltage mode controller generates a first plurality of pulse width modulated signals for each of the plurality of switching circuits of the polyphase switching circuitry and the current mode controller generates a second plurality of pulse width modulated signals for each of the plurality of switching circuits of the polyphase switching circuitry.

14. The dual mode controller of claim 13 further comprising a selector for receiving the first plurality of pulse width modulated signals and the second plurality of pulse width modulated signals, the selector having an output connected to the switching circuitry.

15. The dual mode controller of claim 14 further comprising sensing circuitry which detects output signals from each of the plurality of circuits of the polyphase switching circuitry and generates a corresponding plurality of output signals, the control circuit controlling the selector to provide one of the first plurality of pulse width modulated signals and the second plurality of pulse width modulated signals to an input of the switching circuitry.

16. The dual mode controller of claim 15 wherein the voltage mode controller includes a processor including an input for receiving a DC voltage from a DC source and an output for providing a plurality of center-aligned first pulse width modulated signals.

17. The dual mode controller of claim 16 wherein the current mode controller includes for each circuit of the polyphase switching circuitry:
   a first comparator circuit having a first input and a second input for receiving a first reference signal and second reference signal, respectively, and a third input signal for receiving an output signal of the switching circuitry; and
   a logic circuit connected to the comparator circuit for providing the second pulse width generated waveform on the basis of the amplitude of the output signal of the switching circuitry relative to the amplitude of the first reference signal and second reference signal.

18. The dual mode controller of claim 17 wherein the control circuit is configured to control the selector to provide the second plurality of pulse width modulated signals to the input of the switching circuitry when the amplitude of at least one of the output signals of the circuits of the polyphase switching circuitry is greater than the amplitude of the first reference signal or less than the amplitude of the second reference signal.

19. The dual mode controller of claim 18 wherein the control circuit includes edge detection circuitry for examining edge transitions of the plurality of first pulse width modulated output signals and corresponding ones of the plurality of second pulse width modulated output signals.

20. The dual mode controller of claim 17 wherein the edge detection circuitry and processor are configured to allow alignment of the edge transitions of pulses from the first plurality of pulse width modulated output signals with edge transitions of pulses from corresponding ones of the second plurality of pulse width modulated output signals.

21. The dual mode controller of claim 20 wherein the edge detection circuitry is configured to align the edge transitions of pulses from the first plurality of pulse width modulated output signals with edge transitions of pulse from corresponding ones of the second plurality of pulse width modulated signals.

22. A method for controlling switching circuitry comprising operating in either a voltage mode or a current mode on the basis of an output signal of the switching circuitry.

23. The method of claim 22 further comprising:
   providing a voltage mode controller which generates a first pulse width modulated signal for operation in the voltage mode and a current mode controller which generates a second pulse width modulated signal for operation in the current mode.

24. The method of claim 23 further comprising:

sensing the output signal of the switching circuitry;

determining whether an amplitude level of the output signal is between a first amplitude level and a second amplitude level, the first amplitude level and the second amplitude level defining a predetermined range;

operating the switching circuitry with the voltage mode controller when the amplitude level of the output signal is within the range; and operating the switching circuitry with the current mode controller when the amplitude level of the output signal is outside the range.

25. The method of claim 24 wherein the determining step includes comparing the amplitude level of the output signal with the first amplitude level and the second amplitude level.

26. The method of claim 25 wherein operating in a voltage mode includes providing a first pulse width modulated waveform to the switching circuitry and operating in the current mode includes providing a second pulse width modulated waveform to the switching circuitry.

27. The method of claim 26 wherein the first pulse width modulated waveform is center-aligned.

28. The method of claim 27 further comprising when operating in the current mode, determining the relative alignment of edge transitions of pulses from the first pulse width modulated waveform and the second pulse width modulated waveform.

29. The method of claim 28 comprising, when operating in the current mode, switching to the voltage mode when the edge transitions of pulses from the first pulse width modulated waveform align with the second pulse width modulated waveform.

30. The method of claim 29 wherein aligning edge transitions of pulses from the first pulse width modulated waveform with edge transitions of pulses from the second pulse width modulated waveform includes adjusting the first amplitude level and the second amplitude level, which define the predetermined range.

31. The method of claim 30 further comprising, after switching to the voltage mode from the current mode, resetting the first amplitude level and the second amplitude level to predetermined values.

32. The method of claim 31 wherein resetting the first amplitude level and second amplitude level includes using a comparator circuit having inputs for receiving the predetermined values.

33. A method for controlling polyphase switching circuitry having a plurality of switching circuits operating with predetermined differential phase shifts relative to each other, the method comprising operating in a voltage mode or a current mode on the basis of an output signal from at least one of the plurality of switching circuits of the polyphase switching circuitry.

34. The method of claim 33 further comprising:

an output signal from each of the plurality of switching circuits of the polyphase switching circuitry;

determining whether an amplitude level of each of the output signals is between a first amplitude level and a second amplitude level, the first amplitude level and the second amplitude level defining a predetermined range;

operating the switching circuitry in the voltage mode when each of the amplitude levels of each of the output signals is within the range; and operating the switching circuitry in the current mode when the amplitude level of any of the output signals is outside the range.

35. The method of claim 34 wherein operating in a voltage mode includes providing a first pulse width modulated waveform from a voltage mode controller to each of the circuits of the polyphase switching circuitry and operating in the current mode includes providing a second pulse width modulated waveform from a current mode controller to each of the circuits of the polyphase switching circuitry.

36. The method of claim 35 wherein the first pulse width modulated waveforms are center-aligned.

37. The method of claim 36 further comprising when operating in the current mode, determining the relative alignment of edge transitions of pulses from each of the first pulse width modulated waveforms with pulses from each of the second pulse width modulated waveforms.

38. The method of claim 37 comprising, when operating in the current mode, switching to the voltage mode when edge transitions of pulses from the first pulse width modulated waveform align with corresponding ones of the edge transitions of pulses of the second pulse width modulated waveform.

39. The method of claim 33 wherein aligning edge transitions of pulses from the first pulse width modulated waveforms with edge transitions of pulses from the second pulse width modulated waveforms includes adjusting the first amplitude levels and the second amplitude levels for each circuit.

40. The method of claim 39 further comprising, after switching to the voltage mode from the current mode, resetting the first amplitude levels and the second amplitude levels to predetermined values for each circuit.

41. The method of claim 40 wherein resetting the first amplitude levels and second amplitude levels includes using comparator circuits having inputs for receiving the predetermined values.

* * * * *